(12) United States Patent
Pascolini et al.

(10) Patent No.: US 9,548,527 B2
(45) Date of Patent: Jan. 17, 2017

(54) ELECTRONIC DEVICE WITH FINGERPRINT SENSOR AND TUNABLE HYBRID ANTENNA

(71) Applicant: Apple Inc., Cupertino, CA (US)

(72) Inventors: Mattia Pascolini, San Francisco, CA (US); Nanbo Jin, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 207 days.

(21) Appl. No.: 14/463,299

(22) Filed: Aug. 19, 2014

(65) Prior Publication Data
US 2016/0056527 A1 Feb. 25, 2016

(51) Int. Cl.
*H01Q 1/24* (2006.01)
*G06K 9/00* (2006.01)
*H01Q 13/10* (2006.01)
*G06F 21/32* (2013.01)
*H01Q 9/42* (2006.01)

(52) U.S. Cl.
CPC ............. *H01Q 1/243* (2013.01); *G06F 21/32* (2013.01); *G06K 9/00006* (2013.01); *H01Q 9/42* (2013.01); *H01Q 13/10* (2013.01)

(58) Field of Classification Search
CPC .......... H01Q 13/10; H01Q 1/243; H01Q 9/42
USPC ................. 343/700 MS, 702, 725, 729, 767, 846,343/876
See application file for complete search history.

(56) References Cited

U.S. PATENT DOCUMENTS

| | | | |
|---|---|---|---|
| 7,800,503 B2 | 9/2010 | De Witte et al. | |
| 7,876,274 B2 | 1/2011 | Hobson et al. | |
| 8,106,836 B2 * | 1/2012 | Hill | H01Q 1/243 343/700 MS |
| 8,270,914 B2 | 9/2012 | Pascolini et al. | |
| 8,410,986 B2 | 4/2013 | Hill et al. | |
| 8,610,629 B2 | 12/2013 | Pascolini et al. | |
| 8,798,554 B2 | 8/2014 | Darnell et al. | |

(Continued)

FOREIGN PATENT DOCUMENTS

| | | |
|---|---|---|
| EP | 2405534 | 1/2012 |
| EP | 2528165 | 11/2012 |

OTHER PUBLICATIONS

Bevelacqua et al., U.S. Appl. No. 13/860,396, filed Apr. 10, 2013.

(Continued)

*Primary Examiner* — Tho G Phan
(74) *Attorney, Agent, or Firm* — Treyz Law Group, P.C.; G. Victor Treyz; Michael H. Lyons

(57) ABSTRACT

An electronic device may have wireless circuitry and components such as sensors. The electronic device may have a metal housing having first and second planar rear wall portions separated by a gap. Conductive structures may bridge the gap to electrically couple the first and second rear wall portions. The wireless circuitry may include a hybrid slot inverted-F antenna. The antenna may have an inverted-F antenna resonating element formed from peripheral housing structures that are separated from the second rear wall portion by an opening. The opening may form a C-shaped slot antenna resonating element for the antenna. The sensors may include a fingerprint sensor. The fingerprint sensor may be coupled to a button member in a button. The fingerprint sensor and other portions of the button may overlap the second planar rear wall portion to minimize interference with antenna operation.

22 Claims, 12 Drawing Sheets

(56) References Cited

U.S. PATENT DOCUMENTS

| | | | |
|---|---|---|---|
| 8,896,488 B2* | 11/2014 | Ayala Vazquez | H01Q 1/243 343/702 |
| 8,947,303 B2* | 2/2015 | Golko | G06F 1/1698 343/702 |
| 9,160,058 B2* | 10/2015 | Tsou | H01Q 1/2266 |
| 9,236,659 B2* | 1/2016 | Vazquez | H01Q 13/103 |
| 9,331,397 B2* | 5/2016 | Jin | H01Q 21/28 |
| 9,379,445 B2* | 6/2016 | Zhu | H01Q 13/10 |
| 2010/0073202 A1 | 3/2010 | Mazed | |
| 2011/0241949 A1 | 10/2011 | Nickel et al. | |
| 2012/0112969 A1 | 5/2012 | Caballero et al. | |
| 2012/0112970 A1 | 5/2012 | Caballero et al. | |
| 2012/0299785 A1 | 11/2012 | Bevelacqua | |
| 2013/0169490 A1 | 7/2013 | Pascolini et al. | |
| 2013/0201067 A1 | 8/2013 | Hu et al. | |
| 2013/0203364 A1 | 8/2013 | Darnell et al. | |
| 2013/0231046 A1 | 9/2013 | Pope et al. | |
| 2013/0241800 A1 | 9/2013 | Schlub et al. | |
| 2013/0257659 A1 | 10/2013 | Darnell et al. | |
| 2013/0307818 A1 | 11/2013 | Pope et al. | |
| 2014/0111684 A1 | 4/2014 | Corbin et al. | |

OTHER PUBLICATIONS

Vazquez et al., U.S. Appl. No. 13/889,987, filed May 8, 2013.
Hu et al., U.S. Appl. No. 13/890,013, filed May 8, 2013.
Bevelacqua et al., U.S. Appl. No. 13/851,471, filed Mar. 27, 2013.
Jin et al., U.S. Appl. No. 13/846,471, filed Mar. 18, 2013.
Ouyang et al., U.S. Appl. No. 13/846,459, filed Mar. 18, 2013.
Zhou et al., U.S. Appl. No. 13/846,481, filed Mar. 18, 2013.
Vazquez et al., U.S. Appl. No. 14/096,417, filed Dec. 4, 2013.
Vazquez et al., U.S. Appl. No. 14/283,039, filed May 20, 2014.
iFixit iPhone 5 Teardown. iFixit, Sep. 21, 2012 [retrieved on Mar. 19, 2014]. Retrieved, from the Internet: <URL:https://www.ifixit.com/Teardown/iPhone+5+Teardown/10525>.

* cited by examiner

U.S. 9,548,527 B2

ELECTRONIC DEVICE WITH FINGERPRINT SENSOR AND TUNABLE HYBRID ANTENNA

BACKGROUND

This relates generally to electronic devices and, more particularly, to electronic devices with components such as wireless components and sensors.

Electronic devices often include wireless circuitry with antennas. For example, cellular telephones, computers, and other devices often contain antennas for supporting wireless communications. Sensors and other electrical components are also often included in electronic devices.

It can be challenging to form electronic device antenna structures with desired attributes. In some wireless devices, the presence of conductive housing structures, sensors, and other electrical components can influence antenna performance. Antenna performance may not be satisfactory if the housing structures or electrical components are not configured properly and interfere with antenna operation. Device size can also affect performance. It can be difficult to achieve desired performance levels in a compact device, particularly when the compact device has conductive housing structures.

It would therefore be desirable to be able to provide improved wireless circuitry and electrical components for electronic devices such as electronic devices that include conductive housing structures.

SUMMARY

An electronic device may have wireless circuitry and components such as sensors. The electronic device may have a metal housing having first and second planar rear wall portions separated by a gap. Conductive structures may bridge the gap to electrically couple the first and second rear wall portions. The first rear wall portion may form an antenna ground. The second rear wall portion may form an extended portion of the antenna ground.

The wireless circuitry may include a hybrid inverted-F slot antenna. The antenna may have an inverted-F antenna resonating element formed from peripheral housing structures that are separated from the second rear wall portion by an opening. The opening may form a C-shaped slot antenna resonating element for the antenna.

The sensors may include a fingerprint sensor. The fingerprint sensor may be coupled to a button member in a button. The fingerprint sensor and other portions of the button may overlap the second planar rear wall portion to minimize interference with antenna operation.

An impedance matching circuit may be coupled to the antenna to match the impedance of the antenna to a transmission line. An inductor that is coupled in series with a switch may be coupled to the antenna. Antenna impedance may be measured in real time using a coupler interposed between a transceiver and the antenna. Based on antenna impedance measurements, sensor data, or other information, control circuitry can determine when an external object such as a user's hand is adjacent to the antenna. The inductor may then be switched out of use with the switch to ensure that the antenna is tuned satisfactorily.

DETAILED DESCRIPTION

Figure 1:
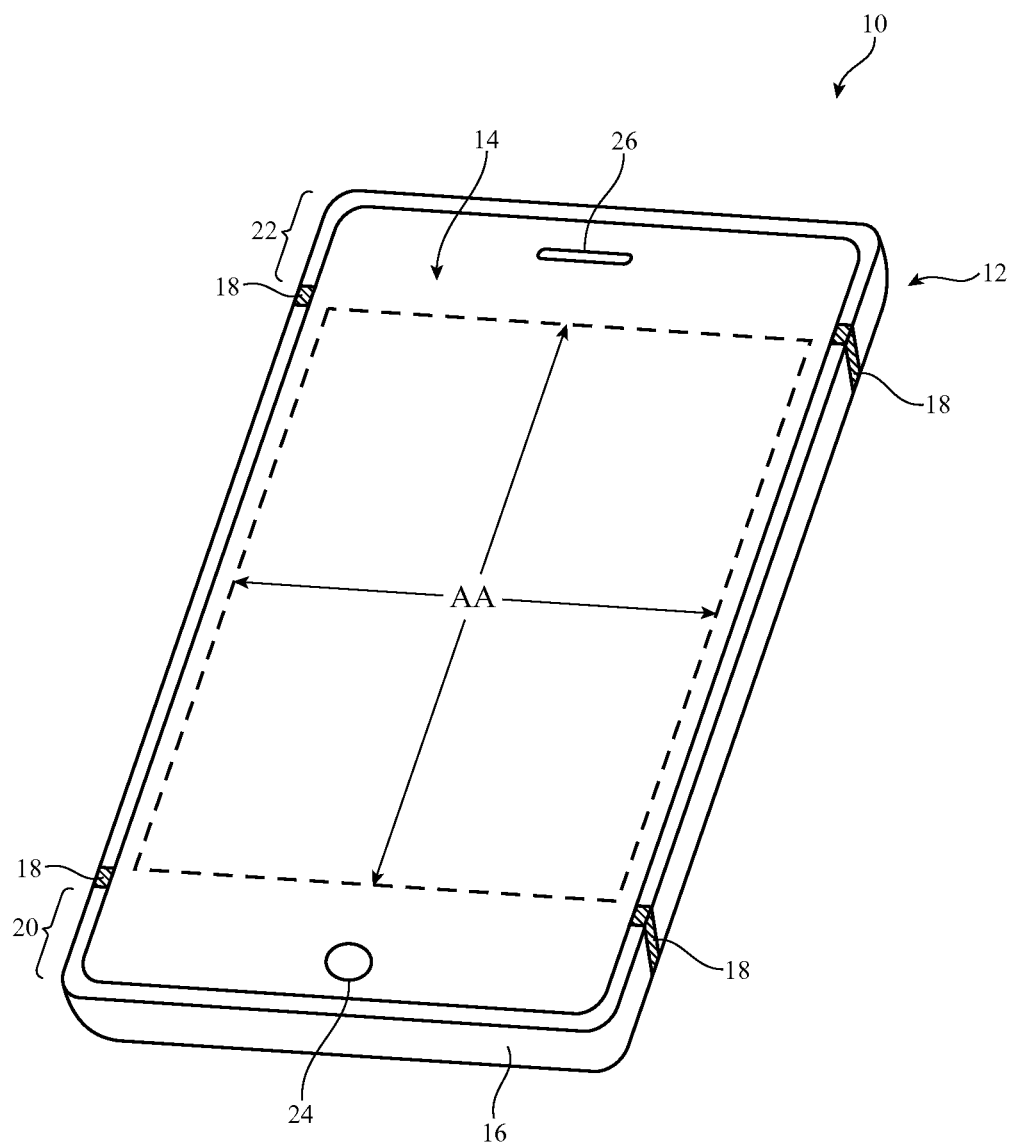
FIG. 1 is a perspective view of an illustrative electronic device in accordance with an embodiment.

Electronic devices such as electronic device 10 of FIG. 1 may be provided with electrical components and wireless communications circuitry. The wireless communications circuitry may include one or more antennas and may be used to support wireless communications in multiple wireless communications bands. An electrical component such as sensor may overlap an antenna in the wireless communications circuitry. For example, a fingerprint sensor may be mounted in a location where the fingerprint sensor overlaps an extended portion of an antenna ground plane. This location may help to minimize interference between the fingerprint sensor and antenna while allowing the fingerprint sensor to be used to capture fingerprints.

The antennas of the wireless communications circuitry can include loop antennas, inverted-F antennas, strip antennas, planar inverted-F antennas, slot antennas, hybrid antennas that include antenna structures of more than one type, or other suitable antennas. Conductive structures for the antennas may, if desired, be formed from conductive electronic device structures. The conductive electronic device structures may include conductive housing structures. The housing structures may include peripheral structures such as peripheral conductive structures that run around the periphery of an electronic device. The peripheral conductive structure may serve as a bezel for a planar structure such as a display, may serve as sidewall structures for a device housing, may have portions that extend upwards from an integral planar rear housing (e.g., to form vertical planar sidewalls or curved sidewalls), and/or may form other housing structures. Gaps may be formed in the peripheral conductive structures that divide the peripheral conductive structures into peripheral segments. One or more of the segments may be used in forming one or more antennas for electronic device 10. Antennas may also be formed using an antenna ground plane formed from conductive housing structures such as metal housing midplate structures and other internal device structures. Rear housing wall structures may be used in forming antenna structures such as an antenna ground.

Electronic device 10 may be a portable electronic device or other suitable electronic device. For example, electronic device 10 may be a laptop computer, a tablet computer, a somewhat smaller device such as a wrist-watch device, pendant device, headphone device, earpiece device, or other wearable or miniature device, a handheld device such as a cellular telephone, a media player, or other small portable device. Device 10 may also be a television, a set-top box, a desktop computer, a computer monitor into which a computer has been integrated, or other suitable electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material. In other situations, housing 12 or at least some of the structures that make up housing 12 may be formed from metal elements.

Device 10 may, if desired, have a display such as display 14. The rear face of housing 12 may have a planar housing wall. The rear housing wall may be separated into first and second portions by a gap that is filled with plastic or other dielectric. Conductive structures may electrically couple the first and second portions together. Display 14 may be mounted on the opposing front face of device 10 from the rear housing wall. Display 14 may be a touch screen that incorporates capacitive touch electrodes or may be insensitive to touch.

Display 14 may include image pixels formed from light-emitting diodes (LEDs), organic LEDs (OLEDs), plasma cells, electrowetting pixels, electrophoretic pixels, liquid crystal display (LCD) components, or other suitable image pixel structures. A display cover layer such as a layer of clear glass or plastic may cover the surface of display 14. Buttons such as button 24 may pass through openings in the cover layer. The cover layer may also have other openings such as an opening for speaker port 26.

Housing 12 may include peripheral housing structures such as structures 16. Structures 16 may run around the periphery of device 10 and display 14. In configurations in which device 10 and display 14 have a rectangular shape with four edges, structures 16 may be implemented using peripheral housing structures that have a rectangular ring shape with four corresponding edges (as an example). Peripheral structures 16 or part of peripheral structures 16 may serve as a bezel for display 14 (e.g., a cosmetic trim that surrounds all four sides of display 14 and/or that helps hold display 14 to device 10). Peripheral structures 16 may also, if desired, form sidewall structures for device 10 (e.g., by forming a metal band with vertical sidewalls, curved sidewalls, etc.).

Peripheral housing structures 16 may be formed of a conductive material such as metal and may therefore sometimes be referred to as peripheral conductive housing structures, conductive housing structures, peripheral metal structures, or a peripheral conductive housing member (as examples). Peripheral housing structures 16 may be formed from a metal such as stainless steel, aluminum, or other suitable materials. One, two, or more than two separate structures may be used in forming peripheral housing structures 16.

It is not necessary for peripheral housing structures 16 to have a uniform cross-section. For example, the top portion of peripheral housing structures 16 may, if desired, have an inwardly protruding lip that helps hold display 14 in place. The bottom portion of peripheral housing structures 16 may also have an enlarged lip (e.g., in the plane of the rear surface of device 10). Peripheral housing structures 16 may have substantially straight vertical sidewalls, may have sidewalls that are curved, or may have other suitable shapes. In some configurations (e.g., when peripheral housing structures 16 serve as a bezel for display 14), peripheral housing structures 16 may run around the lip of housing 12 (i.e., peripheral housing structures 16 may cover only the edge of housing 12 that surrounds display 14 and not the rest of the sidewalls of housing 12).

If desired, housing 12 may have a conductive rear surface. For example, housing 12 may be formed from a metal such as stainless steel or aluminum. The rear surface of housing 12 may lie in a plane that is parallel to display 14. In configurations for device 10 in which the rear surface of housing 12 is formed from metal, it may be desirable to form parts of peripheral conductive housing structures 16 as integral portions of the housing structures forming the rear surface of housing 12. For example, a rear housing wall of device 10 may be formed from a planar metal structure and portions of peripheral housing structures 16 on the sides of housing 12 may be formed as vertically extending integral metal portions of the planar metal structure. Housing structures such as these may, if desired, be machined from a block of metal and/or may include multiple metal pieces that are assembled together to form housing 12. The planar rear wall of housing 12 may have one or more, two or more, or three or more portions.

Display 14 may include conductive structures such as an array of capacitive electrodes, conductive lines for addressing pixel elements, driver circuits, etc. Housing 12 may include internal structures such as metal frame members, a planar housing member (sometimes referred to as a midplate) that spans the walls of housing 12 (i.e., a substantially rectangular sheet formed from one or more parts that is welded or otherwise connected between opposing sides of member 16), printed circuit boards, and other internal conductive structures. These conductive structures, which may be used in forming a ground plane in device 10, may be located in the center of housing 12 under active area AA of display 14 (e.g., the portion of display 14 that contains a display module for displaying images).

In regions 22 and 20, openings may be formed within the conductive structures of device 10 (e.g., between peripheral conductive housing structures 16 and opposing conductive ground structures such as conductive housing midplate or rear housing wall structures, a printed circuit board, and conductive electrical components in display 14 and device 10). These openings, which may sometimes be referred to as gaps, may be filled with air, plastic, and other dielectrics.

Conductive housing structures and other conductive structures in device 10 such as a midplate, traces on a printed circuit board, display 14, and conductive electronic components may serve as a ground plane for the antennas in device 10. The openings in regions 20 and 22 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element from the ground plane, may contribute to the performance of a parasitic antenna resonating element, or may otherwise serve as part of antenna structures formed in regions 20 and 22. If desired, the ground plane that is under active area AA of display 14 and/or other metal structures in device 10 may have portions that extend into parts of the ends of device 10 (e.g., the ground may extend towards the dielectric-filled openings in regions 20 and 22).

In general, device 10 may include any suitable number of antennas (e.g., one or more, two or more, three or more, four or more, etc.). The antennas in device 10 may be located at opposing first and second ends of an elongated device housing (e.g., at ends 20 and 22 of device 10 of FIG. 1), along one or more edges of a device housing, in the center of a device housing, in other suitable locations, or in one or more of these locations. The arrangement of FIG. 1 is merely illustrative.

Portions of peripheral housing structures 16 may be provided with gap structures. For example, peripheral housing structures 16 may be provided with one or more gaps such as gaps 18, as shown in FIG. 1. The gaps in peripheral housing structures 16 may be filled with dielectric such as polymer, ceramic, glass, air, other dielectric materials, or combinations of these materials. Gaps 18 may divide peripheral housing structures 16 into one or more peripheral conductive segments. There may be, for example, two peripheral conductive segments in peripheral housing structures 16 (e.g., in an arrangement with two gaps), three peripheral conductive segments (e.g., in an arrangement with three gaps), four peripheral conductive segments (e.g., in an arrangement with four gaps, etc.). The segments of peripheral conductive housing structures 16 that are formed in this way may form parts of antennas in device 10. If desired, gaps may extend across the width of the rear wall of housing 12 and may penetrate through the rear wall of housing 12 to divide the rear wall into different portions. Polymer or other dielectric may fill these housing gaps (grooves).

In a typical scenario, device 10 may have upper and lower antennas (as an example). An upper antenna may, for example, be formed at the upper end of device 10 in region 22. A lower antenna may, for example, be formed at the lower end of device 10 in region 20. The antennas may be used separately to cover identical communications bands, overlapping communications bands, or separate communications bands. The antennas may be used to implement an antenna diversity scheme or a multiple-input-multiple-output (MIMO) antenna scheme.

Antennas in device 10 may be used to support any communications bands of interest. For example, device 10 may include antenna structures for supporting local area network communications, voice and data cellular telephone communications, global positioning system (GPS) communications or other satellite navigation system communications, Bluetooth® communications, etc.

Figure 2:
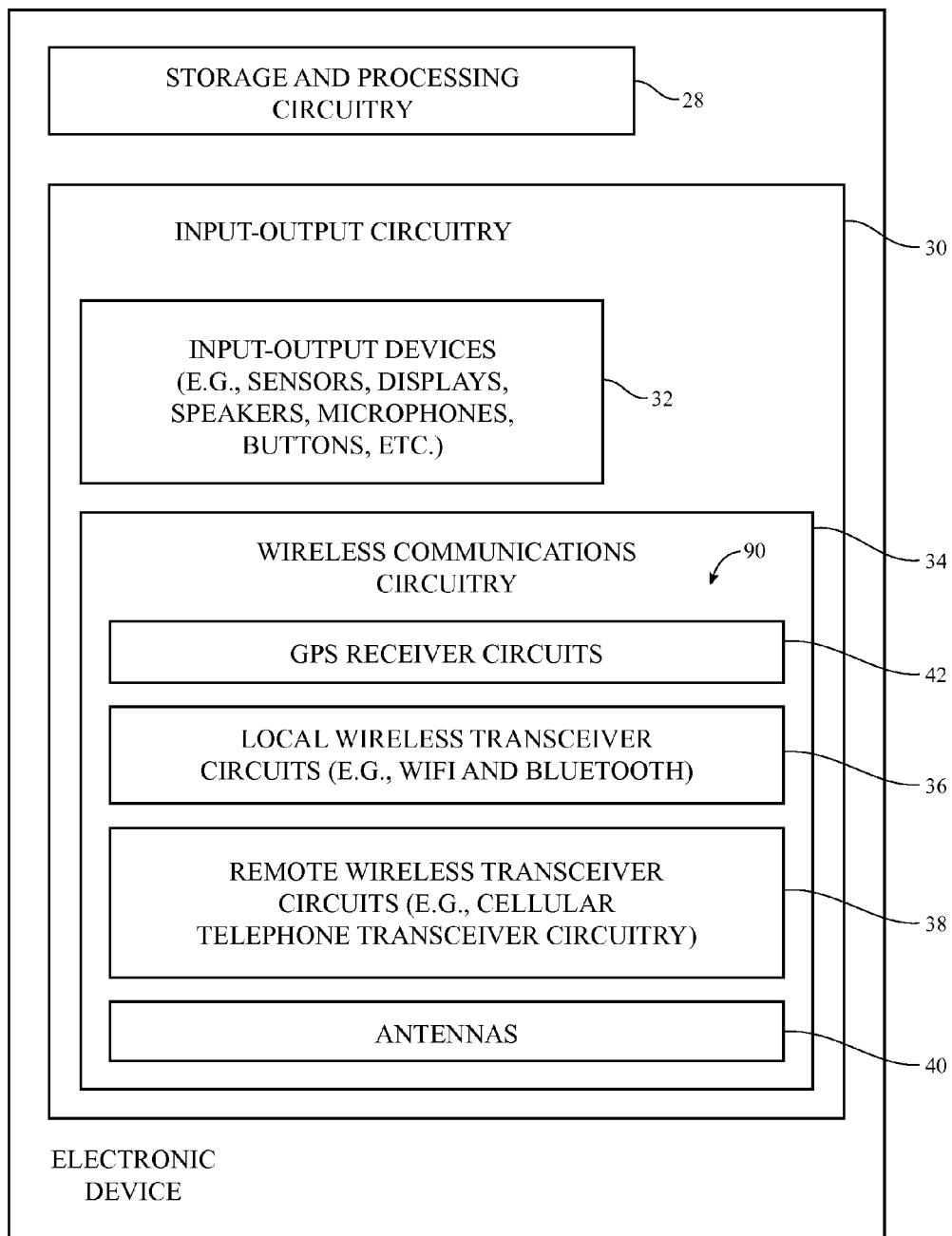
FIG. 2 is a schematic diagram of illustrative circuitry in an electronic device in accordance with an embodiment.

A schematic diagram showing illustrative components that may be used in device 10 of FIG. 1 is shown in FIG. 2. As shown in FIG. 2, device 10 may include control circuitry such as storage and processing circuitry 28. Storage and processing circuitry 28 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 28 may be used to control the operation of device 10. This processing circuitry may be based on one or more microprocessors, microcontrollers, digital signal processors, application specific integrated circuits, etc.

Storage and processing circuitry 28 may be used to run software on device 10, such as internet browsing applications, voice-over-internet-protocol (VOIP) telephone call applications, email applications, media playback applications, operating system functions, etc. To support interactions with external equipment, storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as WiFi®), protocols for other short-range wireless communications links such as the Bluetooth® protocol, cellular telephone protocols, MIMO protocols, antenna diversity protocols, etc.

Input-output circuitry 30 may include input-output devices 32. Input-output devices 32 may be used to allow data to be supplied to device 10 and to allow data to be provided from device 10 to external devices. Input-output devices 32 may include user interface devices, data port devices, and other input-output components. For example, input-output devices may include touch screens, displays without touch sensor capabilities, buttons, joysticks, scrolling wheels, touch pads, key pads, keyboards, microphones, cameras, buttons, speakers, status indicators, light sources, audio jacks and other audio port components, digital data port devices, light sensors, motion sensors (accelerometers), capacitance sensors, proximity sensors, fingerprint sensors (e.g., a fingerprint sensor integrated with a button such as button 24 of FIG. 1), etc.

Input-output circuitry 30 may include wireless communications circuitry 34 for communicating wirelessly with external equipment. Wireless communications circuitry 34 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless communications circuitry 34 may include radio-frequency transceiver circuitry 90 for handling various radio-frequency communications bands. For example, circuitry 34 may include transceiver circuitry 36, 38, and 42. Transceiver circuitry 36 may handle 2.4 GHz and 5 GHz bands for WiFi® (IEEE 802.11) communications and may handle the 2.4 GHz Bluetooth® communications band. Circuitry 34 may use cellular telephone transceiver circuitry 38 for handling wireless communications in frequency ranges such as a low communications band from 700 to 960 MHz, a midband from 1710 to 2170 MHz, and a high band from 2300 to 2700 MHz or other communications bands between 700 MHz and 2700 MHz or other suitable frequencies (as examples). Circuitry 38 may handle voice data and non-voice data. Wireless communications circuitry 34 can include circuitry for other short-range and long-range wireless links if desired. For example, wireless communications circuitry 34 may include 60 GHz transceiver circuitry, circuitry for receiving television and radio signals, paging system transceivers, near field communications (NFC) circuitry, etc. Wireless communications circuitry 34 may include global positioning system (GPS) receiver equipment such as GPS receiver circuitry 42 for receiving GPS signals at 1575 MHz or for handling other satellite positioning data.

In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless communications circuitry 34 may include antennas 40. Antennas 40 may be formed using any suitable antenna types. For example, antennas 40 may include antennas with resonating elements that are formed from loop antenna structures, patch antenna structures, inverted-F antenna structures, slot antenna structures, planar inverted-F antenna structures, helical antenna structures, hybrids of these designs, etc. Different types of antennas may be used for different bands and combinations of bands. For example, one type of antenna may be used in forming a local wireless link antenna and another type of antenna may be used in forming a remote wireless link antenna.

Figure 3:
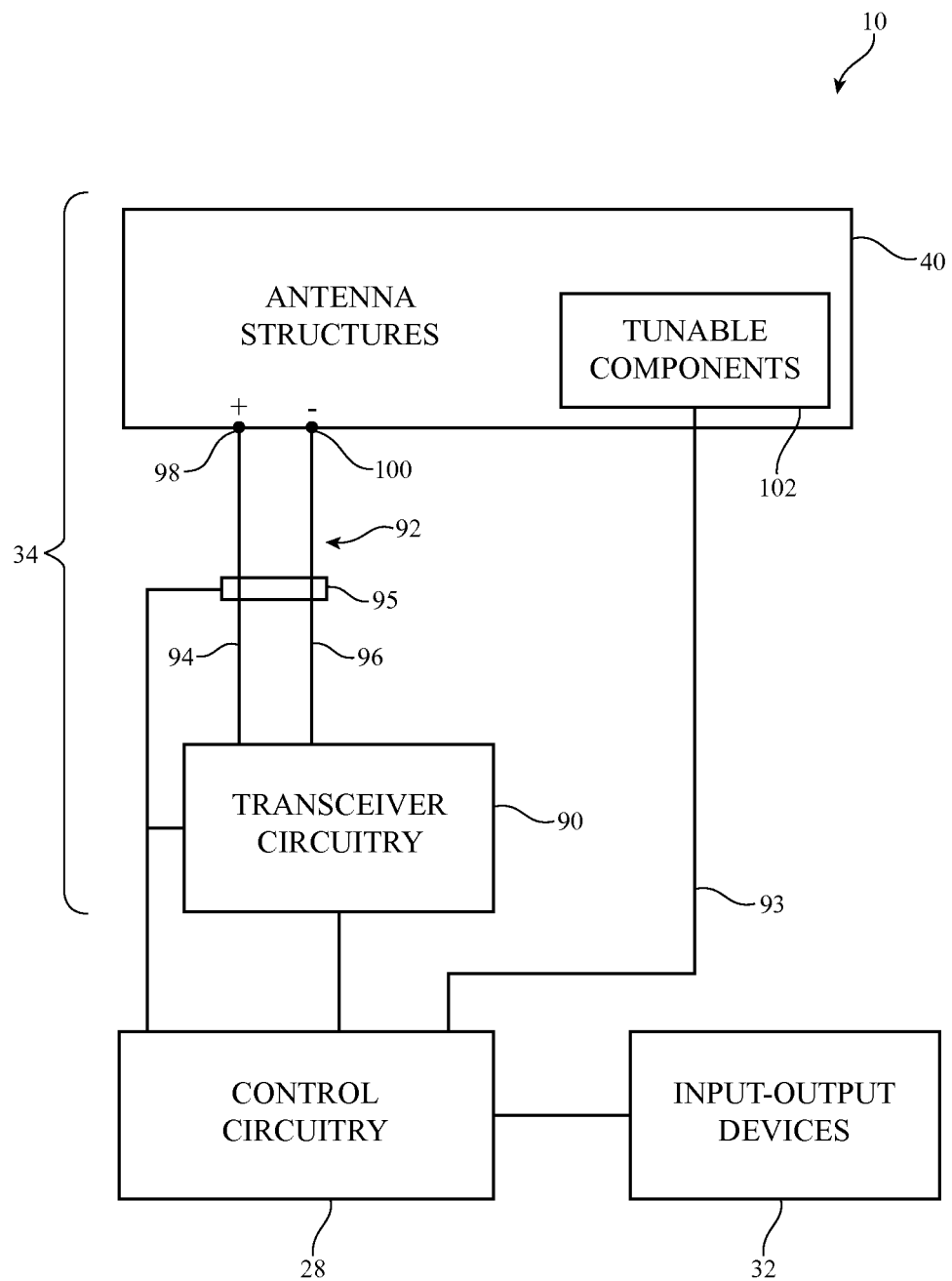
FIG. 3 is a schematic diagram of illustrative wireless circuitry in accordance with an embodiment.

As shown in FIG. 3, transceiver circuitry 90 in wireless circuitry 34 may be coupled to antenna structures 40 using paths such as path 92. Wireless circuitry 34 may be coupled to control circuitry 28. Control circuitry 28 may be coupled to input-output devices 32. Input-output devices 32 may supply output from device 10 and may receive input from sources that are external to device 10.

To provide antenna structures such as antenna(s) 40 with the ability to cover communications frequencies of interest, antenna(s) 40 may be provided with circuitry such as filter circuitry (e.g., one or more passive filters and/or one or more tunable filter circuits). Discrete components such as capacitors, inductors, and resistors may be incorporated into the filter circuitry. Capacitive structures, inductive structures, and resistive structures may also be formed from patterned metal structures (e.g., part of an antenna). If desired, antenna(s) 40 may be provided with adjustable circuits such as tunable components 102 to tune antennas over communications bands of interest. Tunable components 102 may be part of a tunable filter or tunable impedance matching network, may be part of an antenna resonating element, may span a gap between an antenna resonating element and antenna ground, etc. Tunable components 102 may include tunable inductors, tunable capacitors, or other tunable components. Tunable components such as these may be based on switches and networks of fixed components, distributed metal structures that produce associated distributed capacitances and inductances, variable solid state devices for producing variable capacitance and inductance values, tunable filters, or other suitable tunable structures. During operation of device 10, control circuitry 28 may issue control signals on one or more paths such as path 93 that adjust inductance values, capacitance values, or other parameters associated with tunable components 102, thereby tuning antenna structures 40 to cover desired communications bands.

Path 92 may include one or more transmission lines. As an example, signal path 92 of FIG. 3 may be a transmission line having a positive signal conductor such as line 94 and a ground signal conductor such as line 96. Lines 94 and 96 may form parts of a coaxial cable or a microstrip transmission line (as examples). A matching network formed from components such as inductors, resistors, and capacitors may be used in matching the impedance of antenna(s) 40 to the impedance of transmission line 92. Matching network components may be provided as discrete components (e.g., surface mount technology components) or may be formed from housing structures, printed circuit board structures, traces on plastic supports, etc. Components such as these may also be used in forming filter circuitry in antenna(s) 40 and may be tunable and/or fixed components.

Transmission line 92 may be coupled to antenna feed structures associated with antenna structures 40. As an example, antenna structures 40 may form an inverted-F antenna, a slot antenna, a hybrid inverted-F slot antenna or other antenna having an antenna feed with a positive antenna feed terminal such as terminal 98 and a ground antenna feed terminal such as ground antenna feed terminal 100. Positive transmission line conductor 94 may be coupled to positive antenna feed terminal 98 and ground transmission line conductor 96 may be coupled to ground antenna feed terminal 92. Other types of antenna feed arrangements may be used if desired. The illustrative feeding configuration of FIG. 3 is merely illustrative.

A directional coupler such as coupler 95 may be interposed in transmission line path 92. Control circuitry 28 and transceiver circuitry 90 may gather phase and magnitude information on the impedance of antenna 40 (or part of antenna 40) using directional coupler 95. By using coupler 95 or other circuitry to gather real time information on the impedance of antenna 40, control circuitry 28 can determine when antenna 40 is being loaded by external objects (e.g., when a user's hand is in the vicinity of antenna 40 and is therefore affecting the impedance of antenna 40). In response to detecting that a user's hand or other external object is adjacent to antenna 40, control circuitry 28 may take corrective action. For example, control circuitry 28 may adjust an adjustable inductor or other tunable component 102 to ensure that antenna 40 operates as desired. If desired, control circuitry 28 may use information from a proximity sensor (see, e.g., sensors 32 of FIG. 2), received signal strength information, or other information in determining when antenna 40 is being affected by the presence of nearby external objects. The use of antenna feedback from directional coupler 95 is merely illustrative.

Figure 4:
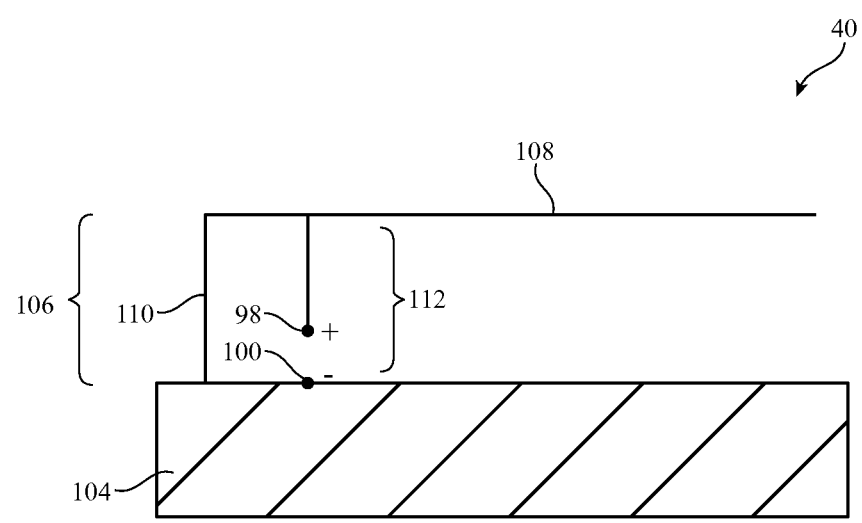
FIG. 4 is a schematic diagram of an illustrative inverted-F antenna in accordance with an embodiment.

FIG. 4 is a diagram of illustrative inverted-F antenna structures that may be used in implementing antenna 40 for device 10. Inverted-F antenna 40 of FIG. 4 has antenna resonating element 106 and antenna ground (ground plane) 104. Antenna resonating element 106 may have a main resonating element arm such as arm 108. The length of arm 108 and/or portions of arm 108 may be selected so that antenna 40 resonates at desired operating frequencies. For example, if the length of arm 108 may be a quarter of a wavelength at a desired operating frequency for antenna 40. Antenna 40 may also exhibit resonances at harmonic frequencies.

Main resonating element arm 108 may be coupled to ground 104 by return path 110. Antenna feed 112 may include positive antenna feed terminal 98 and ground antenna feed terminal 100 and may run in parallel to return path 110 between arm 108 and ground 104. If desired, inverted-F antennas such as illustrative antenna 40 of FIG. 4 may have more than one resonating arm branch (e.g., to create multiple frequency resonances to support operations in multiple communications bands) or may have other antenna structures (e.g., parasitic antenna resonating elements, tunable components to support antenna tuning, etc.). For example, arm 108 may have left and right branches that extend outwardly from feed 112 and return path 110.

Figure 5:
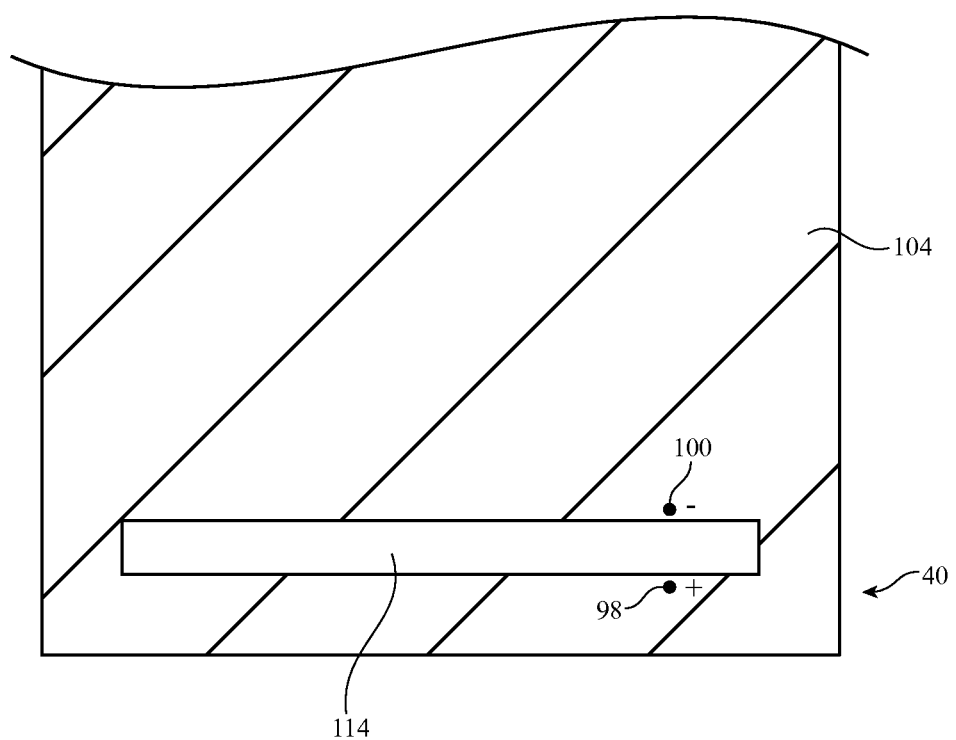
FIG. 5 is a schematic diagram of an illustrative slot antenna in accordance with an embodiment of the present invention.

Antenna 40 may include a slot antenna resonating element. As shown in FIG. 5, for example, antenna 40 may be a slot antenna having an opening such as slot 114 that is formed within antenna ground 104. Slot 114 may be filled with air, plastic, and/or other dielectric. The shape of slot 114 may be straight or may have one or more bends (i.e., slot 114 may have an elongated shape following a meandering path). The antenna feed for antenna 40 may include positive antenna feed terminal 98 and ground antenna feed terminal 100. Feed terminals 98 and 100 may, for example, be located on opposing sides of slot 114 (e.g., on opposing long sides). Slot-based antenna resonating elements such as slot antenna resonating element 114 of FIG. 5 may give rise to an antenna resonance at frequencies in which the wavelength of the antenna signals is equal to the perimeter of the slot. In narrow slots, the resonant frequency of a slot antenna resonating element is associated with signal frequencies at which the slot length is equal to a half of a wavelength. Slot antenna frequency response can be tuned using one or more tunable components such as tunable inductors or tunable capacitors. These components may have terminals that are coupled to opposing sides of the slot (i.e., the tunable components may bridge the slot). If desired, tunable components may have terminals that are coupled to respective locations along the length of one of the sides of slot 114. Combinations of these arrangements may also be used.

If desired, antenna 40 may incorporate conductive device structures such as portions of housing 12. As an example, peripheral conductive structures 16 may include multiple portions such as segments 16B and 16E of FIG. 6. Peripheral conductive structures 16E may be conductive structures that run along the left and right edges of antenna ground plane 104 (e.g., housing sidewalls that are separate from the rear of housing 12 or that are integral portions of housing 12 that extend upwards from the rear wall of housing 12). Ground plane 104 may be formed by portions of a metal housing midplate member, a metal rear housing wall, conductive portions of display 14, or other conductive antenna ground structures. Peripheral conductive structures 16B may run along the end of device 10 (e.g., the lower peripheral edge of device 10 in the example of FIG. 6) and may have shorter portions that run along sections of the left and right edges of device 10.

Along the periphery of device 10, structures 16B and 16E may be separated by gaps such as gaps 18. Gaps 18 may be filled with a dielectric such as polymer. Ground plane 104 may have an extended portion such as extended portion 104E that extends into the space between structures 16B and the rest of ground plane 104 (i.e., the portion of the ground formed from display 14, a metal housing midplate, and/or the central portion of the planar rear wall of housing 12).

Figure 6:
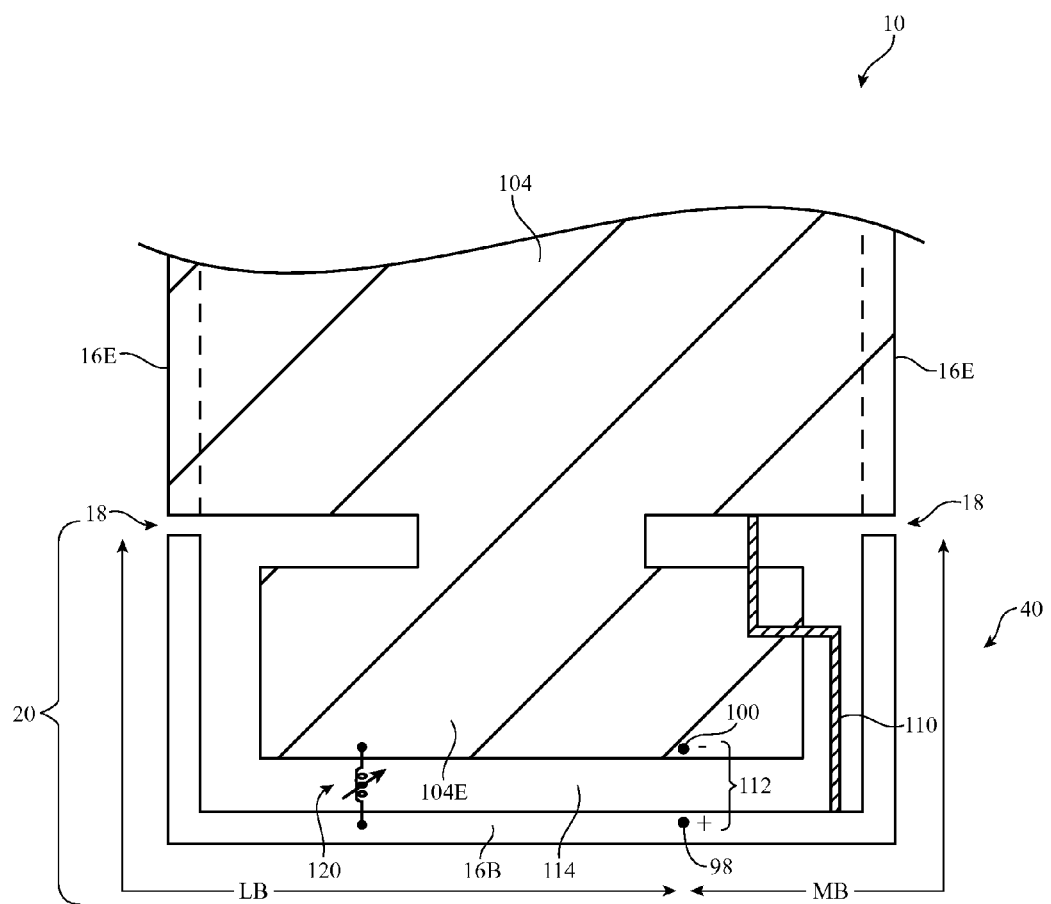
FIG. 6 is a diagram of an illustrative hybrid inverted-F slot antenna in accordance with an embodiment.

In the example of FIG. 6, antenna 40 has been formed at lower end 20 of device 10. This is merely illustrative. Antennas such as antenna 40 of FIG. 6 may be formed at opposing ends of device 10 or different antennas may be formed at each end of device 10. Configurations with more than two antennas for device 10 may also be used.

Antenna 40 may be a hybrid antenna such as a hybrid inverted-F slot antenna having both slot and inverted-F antenna portions. Ground 104 (including ground plane extension 104E) may form an antenna ground for antenna 40. The slot portion of antenna 40 of FIG. 6 may be formed from slot 114 between peripheral conductive structures 16B and ground plane extension 104E of ground 104. Slot 114 may have a C shape as shown in FIG. 6 (i.e., slot 114 may be a C-shaped slot that runs along peripheral edges of device 10 and housing 12) or may have other slots shapes with bends. Straight slots without bends may also be used in forming antenna 40, if desired. The inverted-F portion of antenna 40 of FIG. 6 may be formed from an inverted-F resonating element such as peripheral conductive structures 16B and ground 104 (ground plane extension 104E).

A conductive path such as a strip of metal or metal trace on a printed circuit or plastic carrier may form return path 110 for the inverted-F portion of antenna 40. Return path 110 may be coupled between structures 16B and ground 104 in parallel with feed 112. Antenna tuning may be provided by a tunable circuitry (e.g., a tunable impedance matching circuit or other circuit coupled to antenna 40 at feed terminals 98 and 100 in antenna feed 112) and/or by tunable components such as adjustable inductor 120. Adjustable inductor 120 may span the dielectric gap formed by slot opening 114 and may be coupled between structures 16B and ground extension 104E in parallel with feed 112. Adjustable inductor 120 may be adjusted to tune the frequency associated with the low communications band of antenna 40 or may be used to make other antenna tuning adjustments for antenna 40. There may be capacitances associated with gaps 18. If desired, fixed or tunable inductors may be coupled across gaps 18 to counteract the capacitance associated with gaps 18.

As described in connection with resonating element arm 108 of inverted-F antenna resonating element 106 of FIG. 4, peripheral conductive housing structures 16B may form an inverted-F antenna resonating element that covers one or more communications bands of interest. As an example, peripheral conductive housing structures 16B may have a first portion such as portion LB of FIG. 6 that supports a resonance at a low communications band (e.g., a band covering frequencies from 700 MHz to 960 MHz or other frequency range) and may have a second portion such as portion MB of FIG. 6 that supports a resonance at a mid-frequency ("mid band") communications band (e.g., a band covering frequencies from 1710 MHz to 2170 MHz or other frequency range). Slot 114 may serve as a slot resonating element that supports a resonance at a high communications band (e.g., a band covering frequencies from 2300 MHz to 2700 MHz or other frequency range). The low band, middle band, and high band may lie within a frequency range between 700 MHz and 2700 MHz or other suitable frequency range. If desired, other inverted-F slot hybrid antenna configurations may be used. The example of FIG. 6 in which the inverted-F portion of the hybrid antenna supports low and mid band communications bands and in which the slot antenna resonating element supports communications in a high band is merely illustrative.

Figure 7:
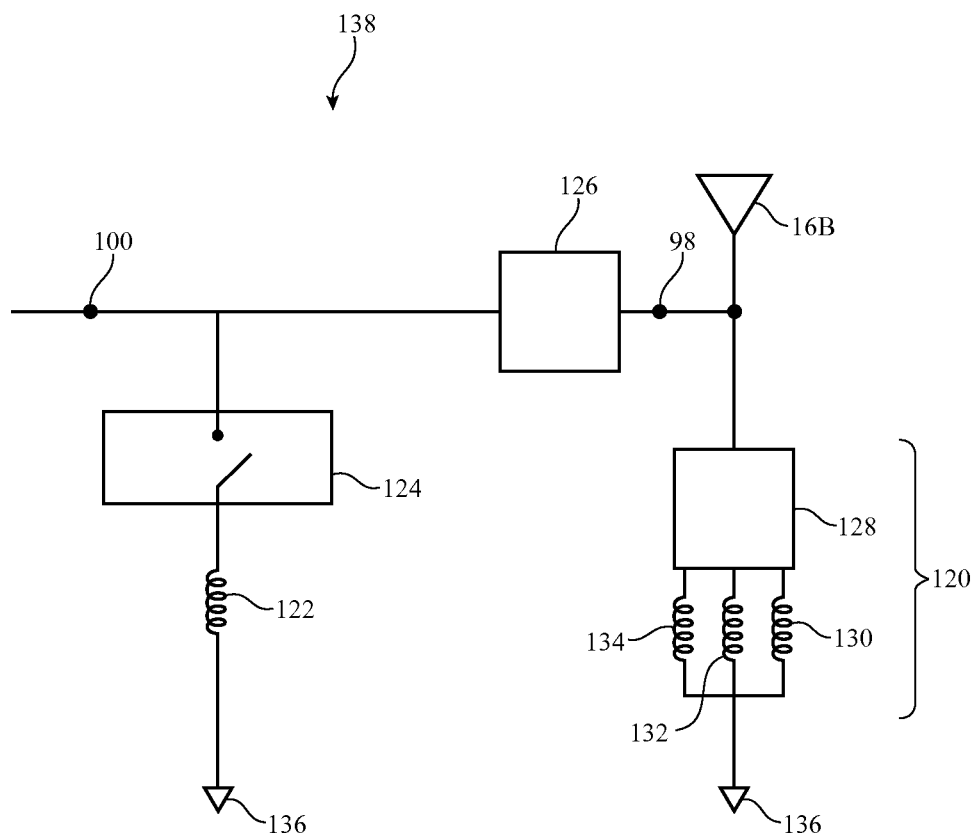
FIG. 7 is a diagram of an illustrative tunable antenna circuitry in accordance with an embodiment.

Transmission line 92 may have an impedance of 50 ohms or other suitable impedance. To help match the impedance of antenna 40 to the impedance of transmission line 92 and thereby enhance antenna performance, device 10 may be provided with an impedance matching circuit. For example, an impedance matching circuit such as matching circuitry 138 of FIG. 7 may be coupled between positive antenna feed terminal 98 and ground antenna feed terminal 100. Ground terminals 136 may be coupled to ground 104 (e.g., extension 104E). Matching circuit 126 may include one or more components that form an impedance matching network such as inductors, capacitors, and resistors. Matching circuit 126 may be coupled between terminals 98 and 100. Tunable inductor 120 (FIG. 6), which may be coupled across slot 114 as shown in FIG. 6, may be implemented using switching circuitry 128 and inductors such as inductors 130, 132, and 134. Inductors 130, 132, and 134 may have different values or two or more of these inductors may have the same value. Switching circuitry 128 may switch one or more of the inductors into use to adjust the overall inductance of adjustable inductor 120. For example, control circuitry 28 can adjust switching circuitry 128 to adjust the inductance of inductor 120 so that antenna 40 can cover a desired communications band (e.g., inductor 120 may be adjusted to tune the low band).

Switching circuit (switch) 124 and inductor 122 may be connected in series and may be coupled to antenna 40 (e.g., at a feed terminal or other location). As an example, switch 124 and inductor 122 may be coupled across one of gaps 18 (or multiple such switchable inductors may be provided). Switch 124 may be controlled by control circuitry 28 and may be used to switch inductor 122 into use and out of use to compensate for potential antenna detuning in the presence of an external object in the vicinity of antenna 40 (e.g., in the vicinity of gap(s) 18). During operation in the absence of a hand or other external object adjacent to antenna 40, switch 124 may be closed and inductor 122 may be switched into use. When a hand of a user or other external object is present in the vicinity of gap(s) 18 (i.e., adjacent to antenna 40), the capacitance of gap(s) 18 may rise. This rise in capacitance has the potential to detune antenna 40. The presence of the user's hand may be detected using a proximity sensor (e.g., a capacitive proximity sensor, a light-based proximity sensor, etc.), using a temperature sensor, using a camera, using an impedance measuring circuit (e.g., feedback from directional coupler 95) to measure the impedance of antenna 40 or a portion of antenna 40 in real time, or using other detection techniques.

Due to the potential of a user's grip to detune antenna, switch 124 may be placed in an open condition whenever the presence of an external object in the vicinity of antenna 40 is detected. When switch 124 is opened in response to detection of the presence of the user's hand or other external object adjacent to antenna 40, inductor 122 will be switched out of use and the frequency response (tuning) of antenna 40 will be maintained as desired.

Figure 8:
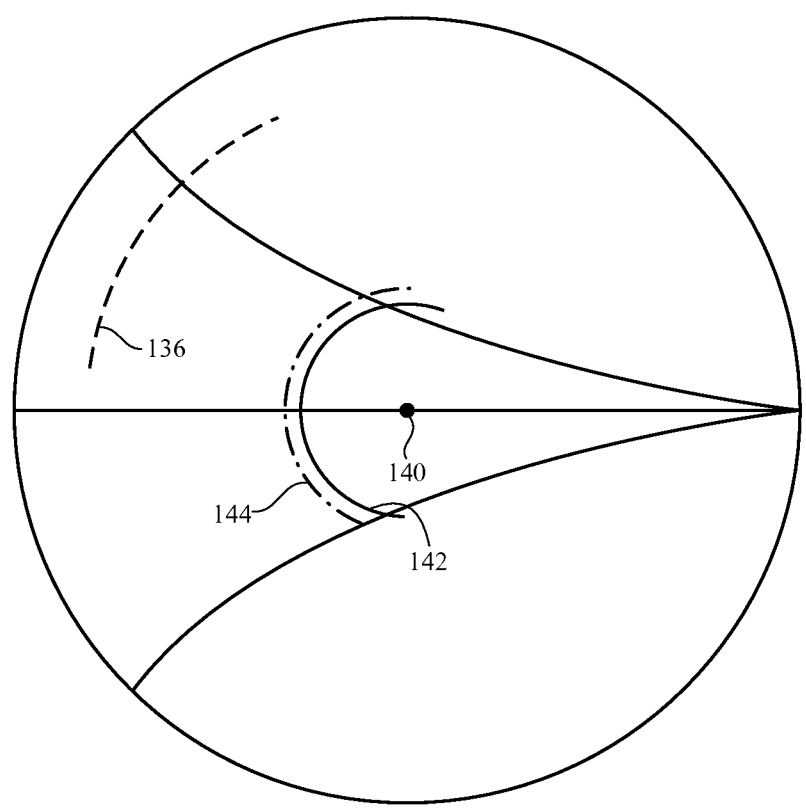
FIG. 8 is a Smith chart illustrating how antenna tuning using a tunable impedance matching network may be used to maintain a desired level of antenna performance in the presence of contact between a user's hand and the antenna in accordance with an embodiment.

FIG. 8 is a Smith chart illustrating the impact of using switching circuitry such as switch 124 to switch inductor 122 into and out of use. Transmission line 92 may have an impedance of 50 ohms (as an example), as illustrated by impedance 140. When antenna 40 is operating normally (across a range of frequencies between 700 MHz and 2700 MHz or other frequency range), antenna 40 may exhibit an impedance such as illustrative impedance 142. Impedance 142 may be associated with the use of inductor 122 of FIG. 7 (i.e., antenna 40 will have impedance 142 when inductor 122 is switched into use by closing switch 124).

Impedance 142 is closely matched to transmission line impedance 140 as desired. Upon placing a user's hand or other external object in the presence of gap(s) 18 (i.e., adjacent to antenna 40), antenna impedance 142 may be detuned to impedance 146, unless switch 124 is opened and inductor 122 is switched out of use. When switch 124 is opened and inductor 122 is switched out of use to adjust the operation of antenna 40 in response to detecting that the user's hand or other external object is present in the vicinity of gap(s) 18 (i.e., detecting that the user's hand is adjacent to antenna 40), antenna 40 will exhibit satisfactory impedance 144. The use of switch 124 to switch inductor 122 in and out of use based on the absence or presence of the user's hand, respectively, may therefore ensure that antenna 40 is not detuned by an unacceptable amount.

Figure 9:
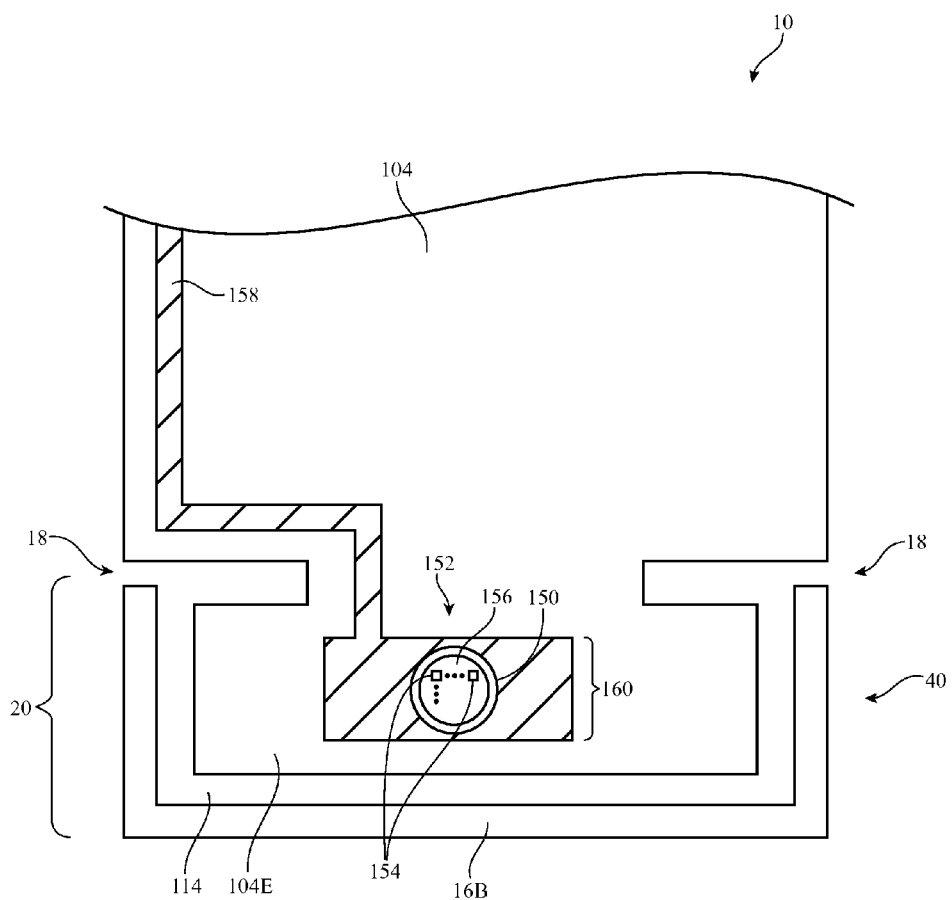
FIG. 9 is a diagram showing how an electrical component such as a fingerprint sensor may be located over a ground plane extension that is used in forming part of a hybrid antenna in accordance with an embodiment.

FIG. 9 shows how an electronic component may be mounted in the vicinity of antenna 40 without disrupting the performance of antenna 40. In the example of FIG. 9, button 24 has been provided with a fingerprint sensor such as fingerprint sensor 152. Fingerprint sensor 152 may include a metal outer ring such as ring 150 or other electrode that supplies an alternating current signal. Ring 150 may surround central area 156. Fingerprint sensor electrodes 154 may be formed in a one-dimensional or two-dimensional array in area 156. When a user places a finger over region 156, signals may be injected into the user's finger from ring 150 and picked up by the array of electrodes 154 in region 156. This allows the fingerprint sensor 152 to measure fingerprint patterns for the user's finger. A captured fingerprint or other data from fingerprint sensor 152 may be conveyed to control circuitry 28 using metal signal traces on flexible printed circuit 158.

Flexible printed circuit 158 may have an end portion such as portion 160 that overlaps extended portion 104E of ground 104. Because the metal traces on portion 160 and the metal structures of fingerprint sensor 152 overlap ground plane extension 104E, antenna 40 operates properly without interference from the presence of fingerprint sensor 152. In the example of FIG. 9, fingerprint sensor 152 overlaps extended portion 104E and is mounted on a flexible printed circuit that extends between extended portion 104E and ground 104 in the center of device 10. This is merely illustrative. Fingerprint sensor 152 may be located in other portions of device 10 on ground plane extension 104E or elsewhere overlapping ground 104.

Figure 10:
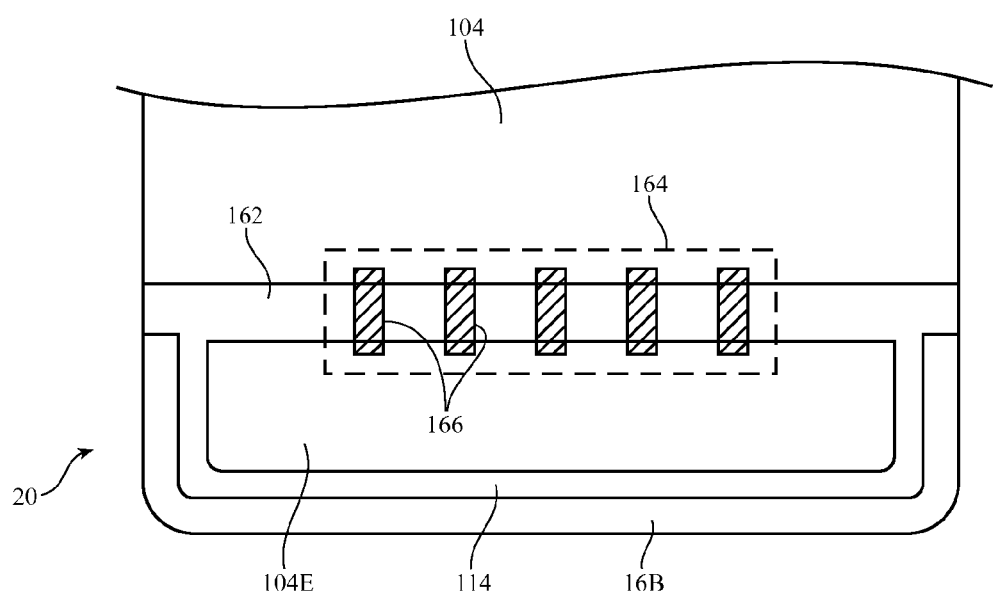
FIG. 10 is an interior top view of an illustrative end of an electronic device with conductive structures bridging a dielectric gap in accordance with an embodiment.

FIG. 10 shows how ground plane extension 104E may be shorted to ground plane 104 through shorting structures 164. Shorting structures 164 may include conductive structures 166 such as strips of metal foil, metal housing structures, metal traces on one or more flexible printed circuits, laser direct structuring metal traces on a plastic carrier, other metal on a dielectric carrier, metal clips, lengths of wire, or other conductive structures that electrically couple ground plane 104 to ground plane extension 104E. Ground plane 104 and ground plane extension 104E in this type of arrangement may be formed from machined metal parts (e.g., planar metal structures such as respective portions of a planar rear wall for housing 12). Conductive structures 166 may be coupled between ground plane 104 and ground plane extension 104E using solder, welds, conductive adhesive, screws or other fasteners, or other conductive coupling structures.

Metal housing 12 may have gaps such as gaps 114 and 162 of FIG. 10. These gaps may be filled with plastic or other dielectric. Gap 114 may separate ground plane extension 104E from peripheral metal housing structures 16B. Gap 162 may separate the planar rear wall portion of metal housing 12 that forms structure 104E from the planar rear wall portion of metal housing 12 that forms ground 104. Gap 162 may be bridged using shorting structures 164. The shorting structures electrically couple the portions of housing forming ground 104 and ground extension 104E, so that ground extension 104E serves as an extension of ground 104.

Figure 11:
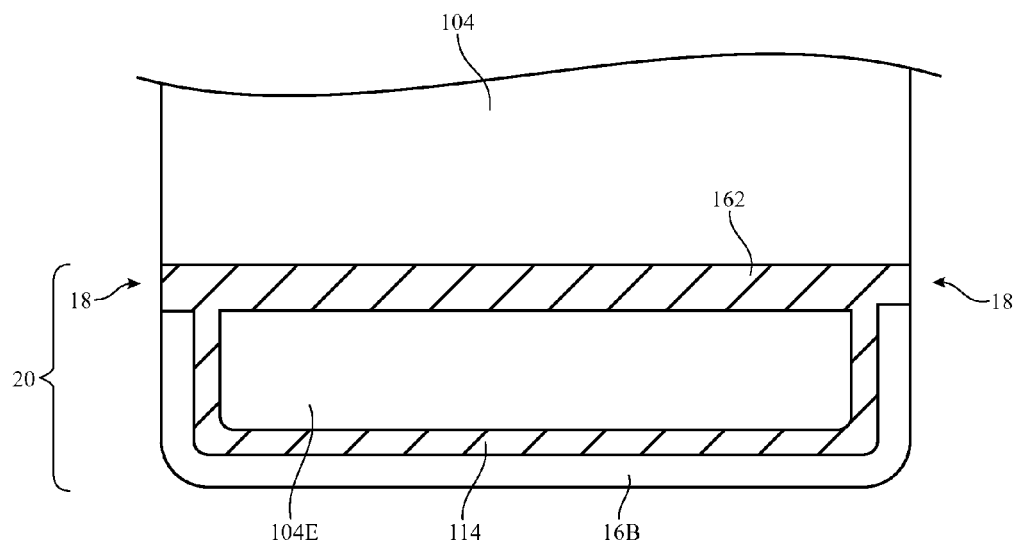
FIG. 11 is an exterior view of an illustrative end of an electronic device with conductive structures.

Shorting structures 164 of FIG. 10 may be formed on the interior of device 10. When viewed from the exterior of device 10, gap 114 and gap 162 may appear as shown in FIG. 11. As shown in FIG. 11, gaps 114 and 162 may be filled with a dielectric material such as plastic. The plastic may lie flush with the outer surface of housing 12. The plastic in gap 162 may cover internal structures such as shorting structures 164 and may therefore hide these internal structures from view.

Figure 12:
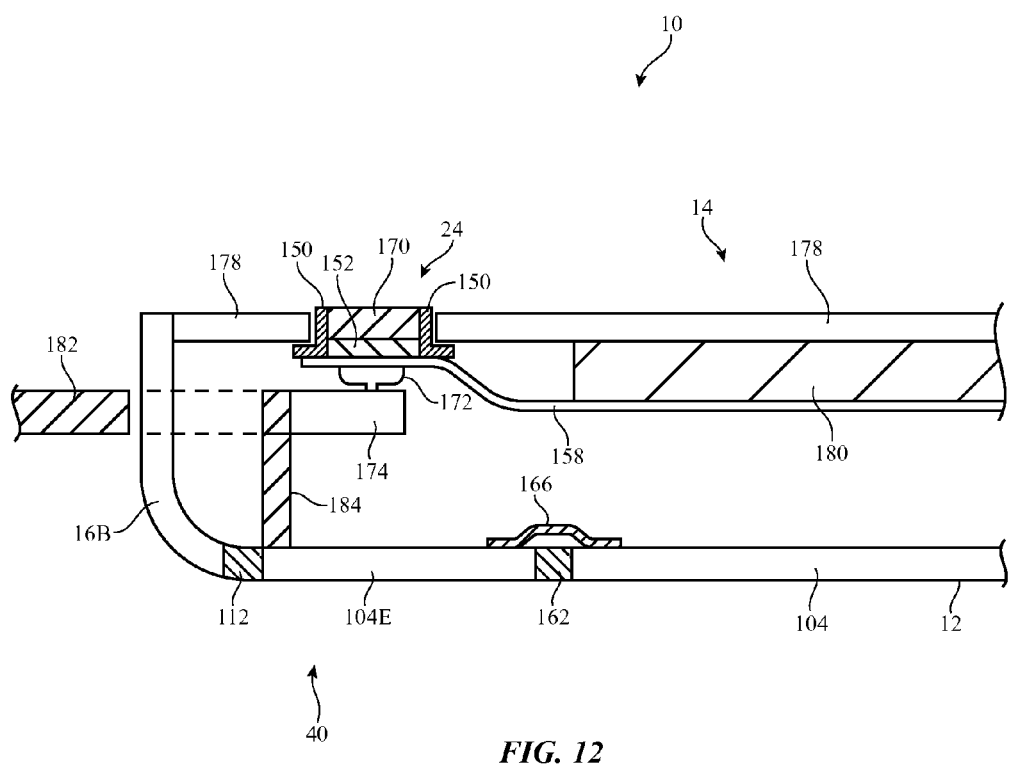
FIG. 12 is a cross-sectional side view of an illustrative electronic device having an electrical component such as a fingerprint sensor that overlaps a ground plane extension associated with an antenna in accordance with an embodiment.

FIG. 12 is a cross-sectional side view of device 10 showing how fingerprint sensor 152 may be formed within button 24 in a portion of device 10 that overlaps ground extension 104E. As shown in FIG. 12, display 14 may have a display cover layer such as display cover layer 178 and a display module such as display module 180. Display cover layer 178 may be formed from a clear layer of glass, a transparent plastic layer, or other transparent material. Display module 180 may be a liquid crystal display module, may be an organic light-emitting diode display module, or may include display layers formed using other types of display technology. Display module 180 may be located in the center of device 10 overlapping the portion of housing 12 associated with ground plane 104. Active area AA of FIG. 1 may cover display module 180 of FIG. 12.

Ground plane 104 of FIG. 12 may be formed from conductive structures such as housing 12, display module 180, a metal midplate (not shown in FIG. 12), metal traces on printed circuit boards, etc. For example, ground plane 104 may be formed from a first planar portion of the rear wall of housing 12. Display module 180 may overlap the central portion of antenna ground (i.e., the portion of ground 104 that is separated from extended ground portion 104E by gap 162) without overlapping extended ground portion 104E. Display cover layer 178 may overlap both the portion of ground 104 that is overlapped by display module 180 and extended ground portion 104E. Extended ground portion 104E may be formed from a second planar portion of the rear wall of housing 12.

Plastic may be used to fill gap 162 between the portion of housing 12 forming ground plane 104 and the portion of housing 12 forming ground plane extension 104E. Conductive structures 166 may electrically connect ground plane extension 104E to housing 12 in ground plane 104. Support structures such as structure 184 and receptacle 174 may form a female connector that receives male connector 182 (e.g., a connector coupled to the end of a cable or other accessory). Button 24 may overlap the connector that receives plug 182 (i.e., button 24 may overlap plug receptacle 174). Peripheral conductive structures 16B may form a housing wall at the end of housing 12 (e.g., the lower end of housing 12). An opening may be formed in peripheral conductive structures 16B to accommodate connector 182.

Button 24 may be formed from a button member such as button member 170 surrounded by metal trim 150 (e.g., a metal ring). Button member 170 may be formed from a dielectric such as plastic or glass (as examples). Button 24 may include fingerprint sensor 152. Fingerprint sensor 152 may be mounted under button member 170 (as an example). During operation, fingerprint sensor electrodes 154 in sensor 152 may be capacitively coupled to a user's finger through the dielectric of button member 170. Metal ring 150 in button 24 may provide alternating current signals that are coupled to electrodes 154 through a user's finger during fingerprint capture operations. Sensor 152 may be coupled to metal traces on flexible printed circuit 158.

Button 24 may have a switch such as switch 172. Switch 172 may be mounted on the lower surface of fingerprint sensor 152, so that button 24 and fingerprint sensor 152 in button 24 overlap switch 172 (as an example). When button 24 (i.e., button member 170) is pressed in a downwards direction (towards the interior of device 10), switch 172 will be compressed between button member 170 and underlying structures such as receptacle 174 or other support structures. When compressed, button 24 will change state (i.e., button 24 will transition from open to closed or vice versa due to actuation of switch 172). Switch 172 may be a dome switch or other suitable switch. Configurations for button 24 that use a capacitive touch sensor to implement button functionality (e.g., a switchless button) may be used, if desired. Because button 24 and fingerprint sensor 152 in button 24 overlap ground plane extension 104E, the operation of antenna 40 will not be disrupted by the presence of button 24 and fingerprint sensor 152.

The foregoing is merely illustrative and various modifications can be made by those skilled in the art without departing from the scope and spirit of the described embodiments. The foregoing embodiments may be implemented individually or in any combination.

What is claimed is:

1. An electronic device, comprising:
   a housing having peripheral conductive structures;
   a hybrid inverted-F slot antenna, wherein the hybrid inverted-F slot antenna has an inverted-F antenna portion formed from an inverted-F antenna resonating element and an antenna ground, the inverted-F antenna resonating element is formed from the peripheral conductive structures, the hybrid inverted-F slot antenna has a slot antenna portion formed from an opening between the inverted-F antenna resonating element and the antenna ground, and the antenna ground has an extended portion adjacent to the slot;
   an antenna feed that feeds both the inverted-F antenna portion and the slot antenna portion; and
   a fingerprint sensor overlapping the extended portion of the antenna ground.

2. The electronic device defined in claim 1 further comprising a flexible printed circuit, wherein the fingerprint sensor is mounted to the flexible printed circuit and a portion of the flexible printed circuit on which the fingerprint sensor is mounted overlaps the extended portion of the antenna ground.

3. The electronic device defined in claim 2 wherein the housing has a metal rear wall and wherein the antenna ground is formed from the metal rear wall.

4. The electronic device defined in claim 3 wherein the extended portion of the antenna ground is formed from the metal rear wall.

5. The electronic device defined in claim 4 further comprising:
   a button that has a switch.

6. The electronic device defined in claim 5 wherein the button overlaps the extended portion of the antenna ground.

7. The electronic device defined in claim 6 wherein the fingerprint sensor is mounted within the button.

8. The electronic device defined in claim 7 wherein the metal rear wall has a first planar portion and a second planar portion that are separated by a gap filled with plastic and that are electrically coupled by conductive structures, the first portion forms at least part of the antenna ground, and the second portion forms the extended portion of the antenna ground.

9. The electronic device defined in claim 8 further comprising:
   a connector receptacle, wherein the button overlaps the connector receptacle.

10. The electronic device defined in claim 9 wherein the opening is a C-shaped slot having a portion that runs along the peripheral conductive structures.

11. The electronic device defined in claim 10 further comprising:
    a display having a display module that overlaps the antenna ground without overlapping the extended portion of the antenna ground and having a display cover layer that overlaps the display module and the extended portion of the antenna ground.

12. The electronic device defined in claim 5 wherein the button comprises a dielectric button member surrounded by a metal trim.

13. The electronic device defined in claim 5 further comprising a display having a display module and a display cover layer formed over the display module, wherein the display cover layer has an opening that overlaps the button.

14. The electronic device defined in claim 1 wherein the slot is a C-shaped slot that runs along peripheral edges of the housing and the antenna feed has first and second feed terminals on opposing sides of the C-shaped slot.

15. The electronic device defined in claim 14 further comprising:
an inductor and a switch that are connected in series and that are coupled to the hybrid inverted-F slot antenna, wherein the switch is configured to switch the inductor into use and out of use to compensate for detuning of the antenna due to presence of an external object adjacent to the hybrid inverted-F slot antenna.

16. The electronic device defined in claim 1 further comprising:
a display having a display module that overlaps the antenna ground without overlapping the extended portion of the antenna ground and having a display cover layer that overlaps the display module and the extended portion of the antenna ground.

17. The electronic device defined in claim 1 further comprising a transmission line coupled to the hybrid inverted-F slot antenna and a tunable impedance matching circuit interposed in the transmission line.

18. An electronic device, comprising:
a hybrid inverted-F slot antenna having an inverted-F antenna resonating element, a slot antenna resonating element, and an antenna ground; and
a switch and an inductor coupled to the hybrid inverted-F slot antenna, wherein the switch is configured to switch the inductor out of use in response to detecting a user's hand adjacent to the antenna.

19. The electronic device defined in claim 18 further comprising a fingerprint sensor that overlaps a portion of the antenna ground.

20. The electronic device defined in claim 19 wherein the slot antenna resonating element is formed from a C-shaped slot that separates the inverted-F antenna resonating element from the portion of the antenna ground.

21. The electronic device defined in claim 20 further comprising an adjustable inductor that is coupled across the slot antenna resonating element and that tunes a low communications band for the hybrid inverted-F slot antenna.

22. The electronic device defined in claim 20, wherein the C-shaped slot has first, second, and third portions that separate the inverted-F antenna resonating element from the portion of the antenna ground, the first portion extends substantially perpendicular from a first end of the second portion, and the third portion extends substantially perpendicular form a second end of the second portion.

* * * * *